Dec. 4, 1928.

H. J. ENGBRECHT 1,694,096

GREASE CHARGING APPARATUS

Filed Dec. 2, 1925   9 Sheets-Sheet 1

Dec. 4, 1928.

H. J. ENGBRECHT 1,694,096

GREASE CHARGING APPARATUS

Filed Dec. 2, 1925 9 Sheets-Sheet 2

Dec. 4, 1928.

H. J. ENGBRECHT

1,694,096

GREASE CHARGING APPARATUS

Filed Dec. 2, 1925      9 Sheets-Sheet 3

Dec. 4, 1928.

H. J. ENGBRECHT 1,694,096

GREASE CHARGING APPARATUS

Filed Dec. 2, 1925 9 Sheets-Sheet 5

Inventor:
Herman J. Engbrecht,
By Dyrenforth, Lee, Chritton & Wiles
Att'ys

Dec. 4, 1928.

H. J. ENGBRECHT

GREASE CHARGING APPARATUS

Filed Dec. 2, 1925

Inventor:
Herman J. Engbrecht,

Patented Dec. 4, 1928.

1,694,096

UNITED STATES PATENT OFFICE.

HERMAN J. ENGBRECHT, OF CHICAGO, ILLINOIS, ASSIGNOR TO STANDARD OIL COMPANY, OF CHICAGO, ILLINOIS, A CORPORATION OF INDIANA.

GREASE-CHARGING APPARATUS.

Application filed December 2, 1925. Serial No. 72,656.

My invention relates, more particularly, to apparatus for introducing grease under relatively great pressure into bearings, particularly of automobiles, and has to do more especially with the relieving of the pressure in the hose-line through which the grease is conducted to the bearing, in the event that the accumulations in the bearings resist the forcing of the grease into them under the pressure in the hose-line; my object, generally stated, being to provide novel and highly effective means for this purpose.

Referring to the accompanying drawings:—

The particular apparatus illustrated in the drawings, generally stated, comprises a container 50 to receive a relatively large amount of grease to be supplied to the bearings to be lubricated and which serves as a source of supply from which the grease passes to piston and cylinder mechanism represented generally at 51 which is operated by fluid pressure supplied thereto under the control of automatically reversing valve mechanism and which operates to place the grease under the desired high pressure for delivery, as desired, through a hose-line, or hose-lines, to the nipples of bearings to be lubricated.

Figure 1:
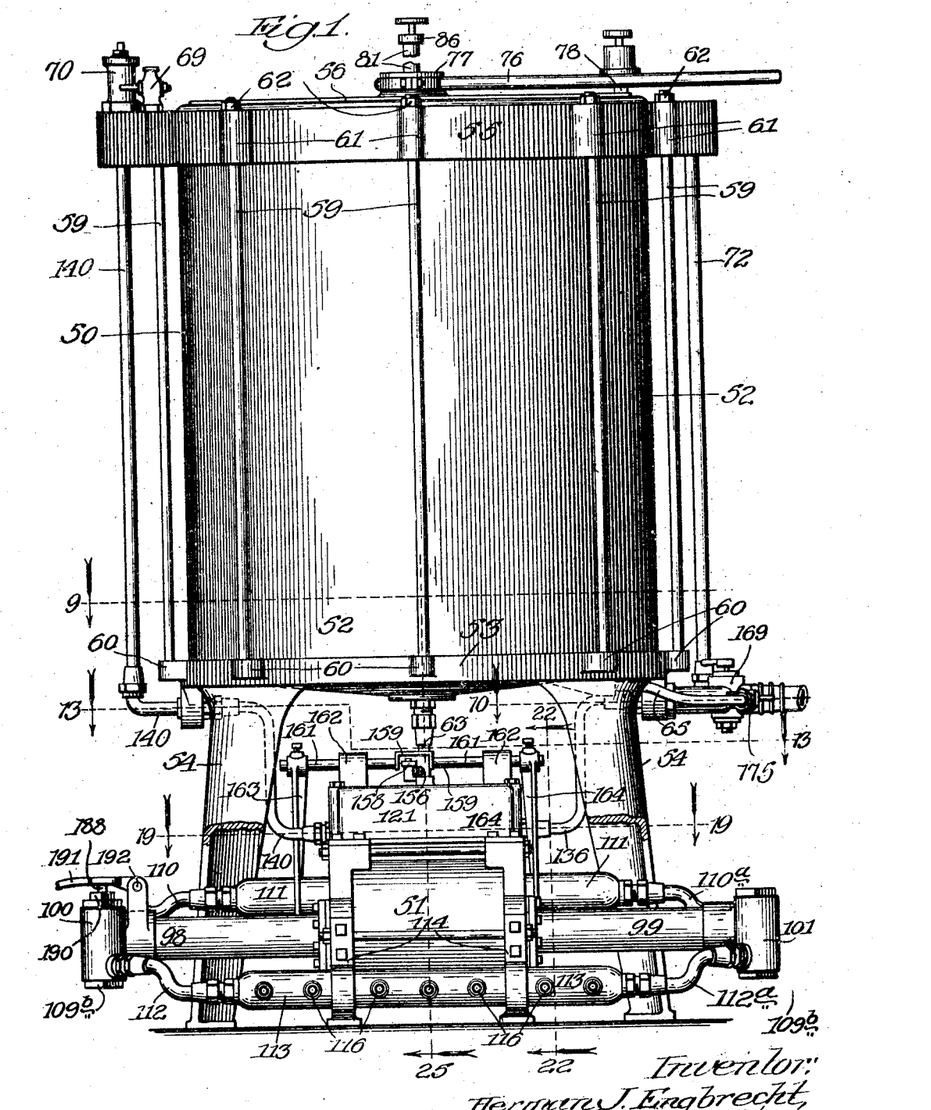
Figure 1 is a view in side elevation of an apparatus embodying my invention, the hose-lines through which the grease is conducted to the bearings to be lubricated, being shown sectioned.
Figures 2, 3, 4, 5, 6, 7, 8:
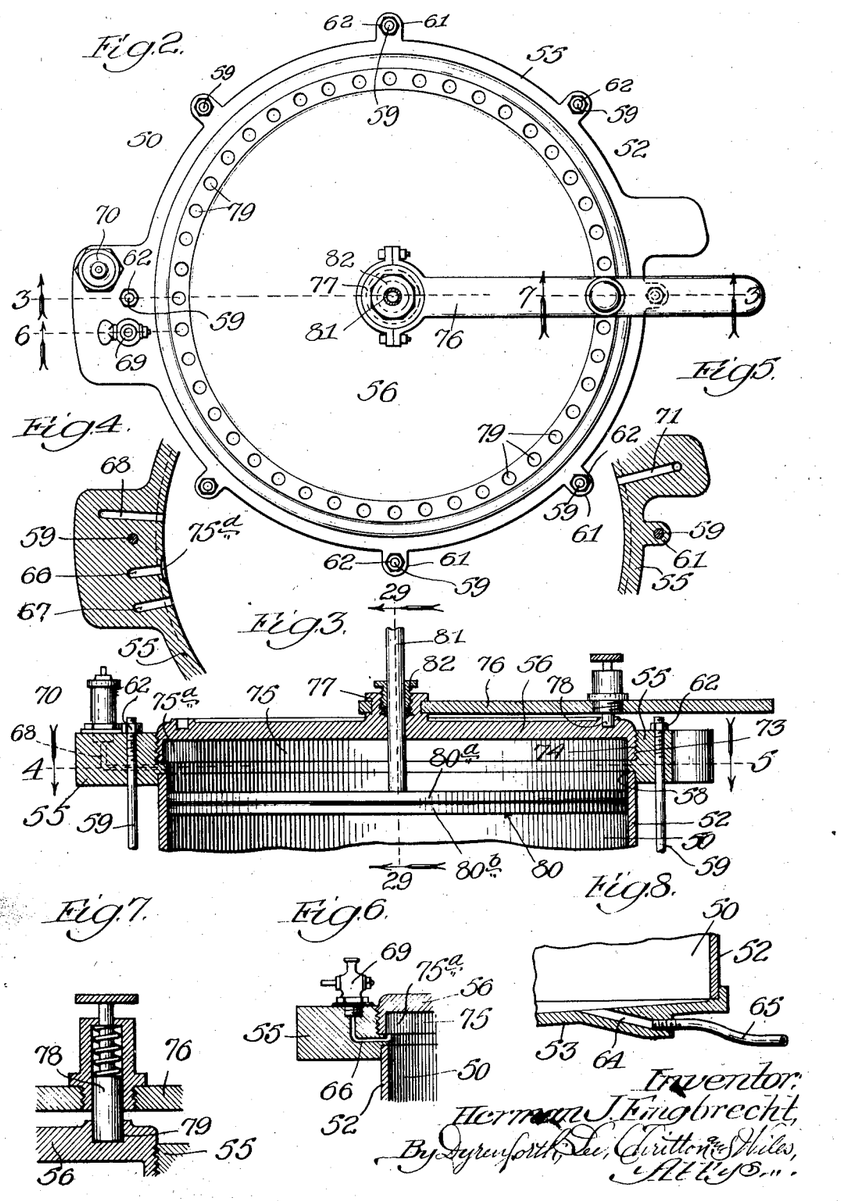
Figure 2 is a plan view of a grease-container forming a portion of the apparatus.
Figure 3 is a broken sectional view taken at the line 3—3 on Fig. 2 and viewed in the direction of the arrows.
Figure 4 is a broken plan sectional view taken at the line 4 on Fig. 3 and viewed in the direction of the arrow.
Figure 5 is a plan sectional view taken at the line 5 on Fig. 3 and viewed in the direction of the arrow.
Figure 6 is a broken sectional view taken at the line 6 on Fig. 2 and viewed in the direction of the arrow, this view showing a pet-cock-equipped portion of the grease-container.
Figure 7 is a broken section taken at the line 7 on Fig. 2 and viewed in the direction of the arrow, this view showing a portion of the mechanism by which the head at the upper end of the grease container may be rotated to screw it into, or out of, assembled relation to the other parts of the container.
Figure 8 is a broken sectional view through the bottom of the grease-container, the section being taken at the line 8 on Fig. 9 and viewed in the direction of the arrow.

The grease container 50 comprises the cylindrical side-wall-forming portion 52 surmounting the plate portion 53 mounted on legs 54, this plate forming the bottom wall of the container, a ring member 55 at the upper end of the side wall 52, and an upper-end-forming member 56. The plate member 53 is annularly recessed to receive the lower end of the side-wall-forming portion 52, and the ring 55 is similarly recessed to the depth of the thickness of the wall 52, as represented at 58, to receive the upper end portion of this wall, the parts just referred to being rigidly secured together to produce tight joints, by bolts 59 screwed at their lower ends into outwardly extending lugs 60 on the plate 53 and provided at their upper ends, at which they protrude through radially extending lugs 61 on the ring 55, with clamping nuts 62. The inner bottom-forming surface of the plate 53, inclines in all directions, as shown toward an outlet in communication with a pipe 63 through which the grease passes from the container to the piston and cylinder mechanism 51, the plate 53 also containing a port 64 connected with a pipe 65 to receive fluid pressure for lifting the piston hereinafter described, in the container 50. The ring 55 contains three ports 66, 67 and 68 which open into the interior of the container, the port 66 leading to a pet-cock 69 mounted in the ring 55, the port 67 forming a port through which fluid pressure discharging from the piston and cylinder mechanism, is supplied to the container above the piston therein for forcing the latter downwardly to discharge the grease through the pipe 63 to the piston and cylinder mechanism, and the port 68 opening into a relief valve 70, the ring 55 also containing a port 71 (Fig. 5) communicating at one end with a pipe 72 (Fig. 1) which leads to valve mechanism hereinafter described and opens into the interior of the container. The upper end of the ring 55 is internally annularly recessed as represented at 73 and provided with screw threads to receive the screw-threaded portion 74 of the member 56, which latter is recessed at its under side as represented at 75, the recess 75 being enlarged at 75ᵃ along an arc extending at opposite sides of the port 66 to register with this port. As means for readily screwing the member 56 into the ring 55 and unscrewing it therefrom, a lever mechanism comprising the lever 76 is provided. This lever is pivoted at its inner end on an upwardly extending boss 77 on the member 56 and extends beyond the side wall 52 of the container to permit of its being grasped by the hand of the operator, for operating it. The lever 76 is provided with a depending downwardly spring-pressed pin 78 which is adapted to be entered into any one of a circular series of sockets 79 provided in the member 56, to produce driving connection between the lever and this member, this construction permitting the operator to rotate the member 56 in either direction, as desired, by oscillating the lever 76, preliminary to each of which operations the operator re-positions the pin 78 in the openings 79, this lever mechanism operating somewhat in the nature of a ratchet lever.

The grease container unit also comprises a grease-displacing piston 80 located within the receptacle 52 and formed of upper and lower cup-members 80ᵃ and 80ᵇ and provided with an upwardly extending stem 81 which slides vertically in an opening in the member 56; a stuffing-box 82 ensuring a tight joint between this member and the stem. The piston is of a thickness slightly less than the depth of the recess 75 in the member 56 and when in its uppermost position is entirely housed within this recess. This feature in connection with the feature of providing the inner surface of the wall 52 flush with the inner surface of the ring 55 permits of the ready movement of the piston 80 into the confines of the side-wall-forming portion 52 in the replacing of the member 56 on the ring 55, following the operation of charging the container with grease.

The stem 81 of the piston 80 is hollow and opens at its lower end through the bottom of the piston, it being provided internally with a tapered valve seat 83 located below outlet ports 84 in the wall of the stem 81, and with which cooperates a needle valve 85 threaded in a cap 86 secured to the upper end of the stem 81, the purpose of this valve being to control communication between the space below the piston and that above the piston to equalize the pressure in these spaces.

Figure 22:
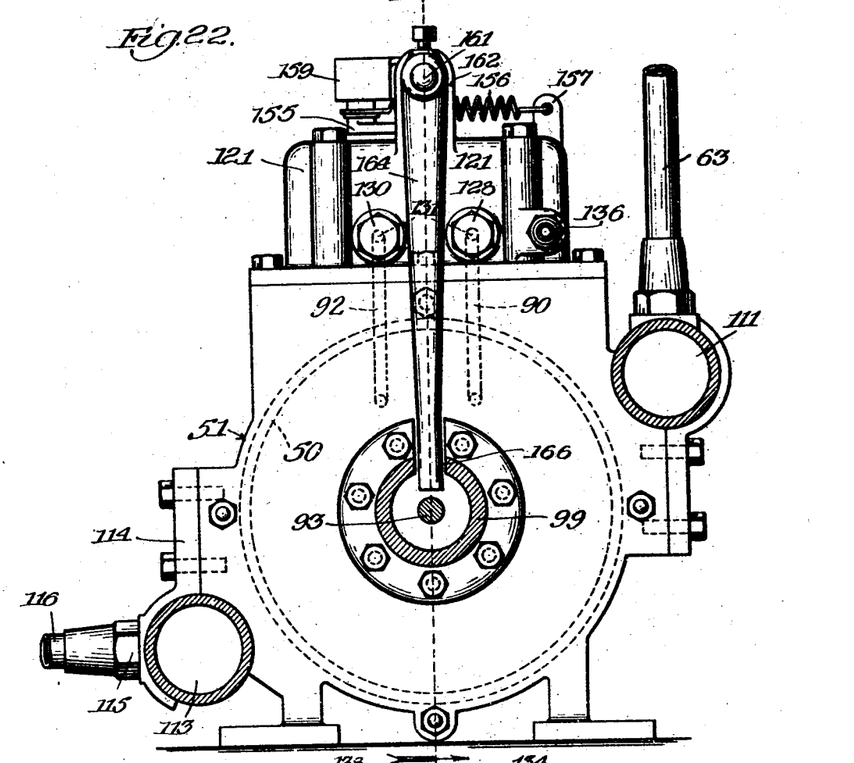
Figure 22 is an enlarged section taken at the line 22 on Fig. 1 and viewed in the direction of the arrows.
Figure 23:
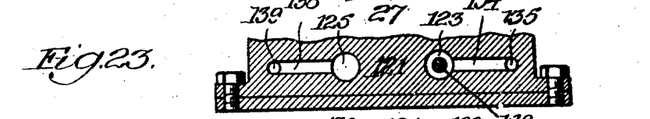
Figure 23 is a section taken at the line 23 on Fig. 19 and viewed in the direction of the arrow.
Figure 24:
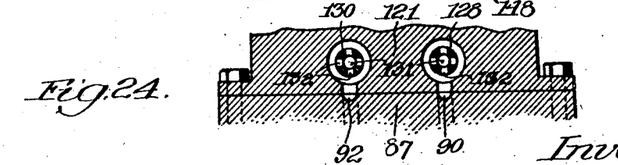
Figure 24 is a section taken at the line 24 on Fig. 19 and viewed in the direction of the arrow.
Figures 25, 26:
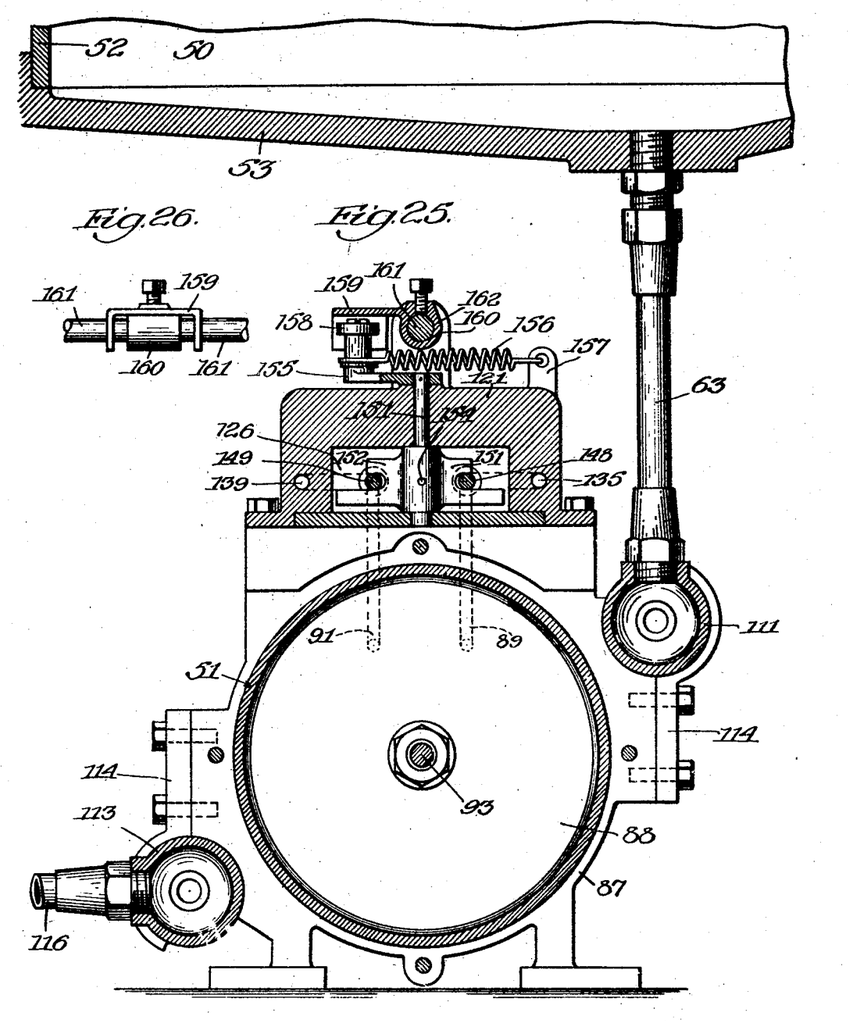
Figure 25 is an enlarged section taken at the line 25 on Fig. 1 and viewed in the direction of the arrow.
Figure 26 is a broken view in side elevation of the tappet-equipped portion of the apparatus for controlling the valve mechanism of Figs. 18 and 19.

Referring now to the piston and cylinder mechanism 51 it comprises a cylinder 87 containing a power piston 88 adapted to be reciprocated therein by the introduction of fluid pressure into the ends of the cylinder, alternately, through ports 89 and 90, respectively, in the ends of the cylinder 87, these respective ends of the cylinder containing exhaust ports 91 and 92, respectively, (Figs. 25 and 22), the admission of the fluid pressure to these inlet ports and the exhaust of fluid pressure therefrom, for reciprocating the piston 88, being automatically controlled by valve mechanism hereinafter described and shown as mounted on the cylinder 87. The piston 88 is connected with a stem 93, midway between the ends of the latter, this stem being reciprocable in packing glands 94 and 95 located in the ends of the cylinder 87, the ends of the stem 93 being connected with grease-displacement pistons 96 and 97. The pistons 96 and 97 which, as noted, are of considerably smaller diameter than the power piston 88, are reciprocable in similar grease-displacement cylinders 98 and 99, respectively, shown as connected with the end walls of the cylinder 87 and extending in alignment with each other and with the cylinder 87.

In the apparatus shown the grease to be supplied to the bearings is caused to enter the cylinders 98 and 99, alternately, upon the suction strokes of the pistons therein, and be forced from these cylinders alternately, under the desired pressure, upon the movement of these pistons in the opposite direction.

Figures 29, 30, 31, 32, 33:
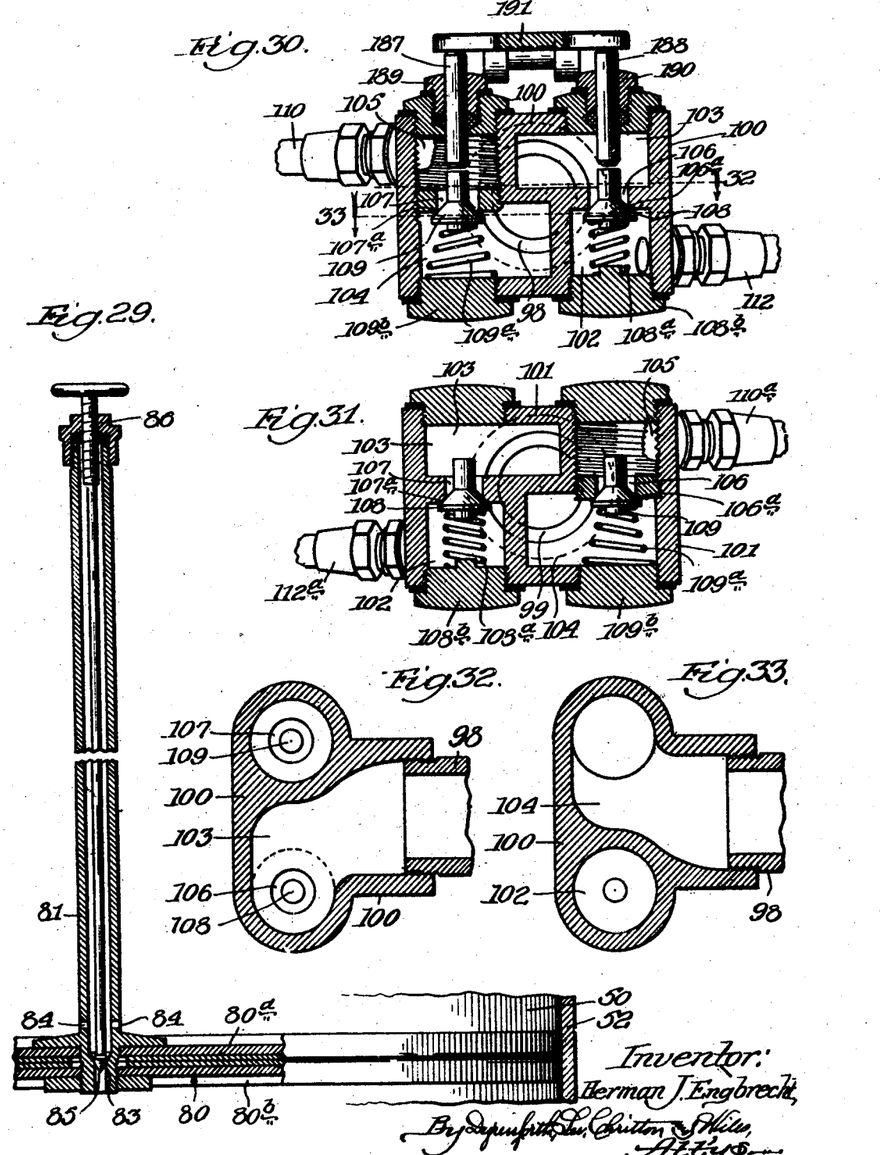
Figure 29 is a view in vertical sectional elevation on the stem-equipped piston which operates in the grease-container, a portion of the piston being shown in elevation and a portion of the cylinder of the container in section, the section being taken at the line 29 on Fig. 3 and viewed in the direction of the arrow.
Figure 30 is an enlarged broken section taken at the line 30 on Fig. 13 and viewed in the direction of the arrow.
Figure 31 is a similar view taken at the line 31 on Fig. 13 and viewed in the direction of the arrow.
Figure 32 is a section taken at the line 32 on Fig. 30 and viewed in the direction of the arrow.
Figure 33 is a section taken at the line 33 on Fig. 31 and viewed in the direction of the arrow.

In the arrangement shown the cylinders 98 and 99 open, at their outer ends, into similar hollow heads 100 and 101, respectively, each of these heads being partitioned lengthwise to provide the chambers 102, 103, 104 and 105, the chambers 103 and 104 opening into the outer ends of the cylinders 98 and 99 as represented in Figs. 30 and 31. Portions of the partitions separating the chambers 102 and 103 and the chambers 104 and 105, are apertured as represented at 106 and 107, with the lower edges of these apertures forming valve seats represented at 106ª and 107ª, respectively, with which co-operate check valves 108 and 109 which seat in the same direction, the check valves 109 opening toward the cylinders with which they co-operate, and the check valves 108 opening away from these cylinders. As shown these check valves are normally held seated under the action of coil springs 108ª and 109ª confined between them and plugs 108ᵇ and 109ᵇ screwed into openings in these heads. The heads 100 and 101 communicate at their chambers 105, with pipes 110 and 110ª, respectively, which open at their outer ends into a manifold 111 which communicates with the pipe 63 leading from the container 50 and through which the grease passes from the latter to the manifold 111. The heads 100 and 101 communicate at their chambers 102, with pipes 112 and 112ª, respectively, which open into the ends of a manifold 113, the manifolds 111 and 113 being shown as supported side by side on the cylinder 87 by means of the brackets 114.

The manifold 113 into which the grease is discharged under high pressure alternately through the pipes 112 and 112ª, is provided with a plurality of outlets 115 to which flexible hose-lines 116 adapted to be applied to the bearings to be lubricated, are connected.

It will be understood from the foregoing that upon introducing fluid pressure into the ends of the cylinder 87, alternately, and alternately venting this cylinder ahead of the piston 88 therein, the piston 88 will be reciprocated in this cylinder, with the result of reciprocating the grease-displacing pistons 96 and 97 which operate alternately to force grease to the manifold 113.

Figures 13, 14, 15, 16, 17:
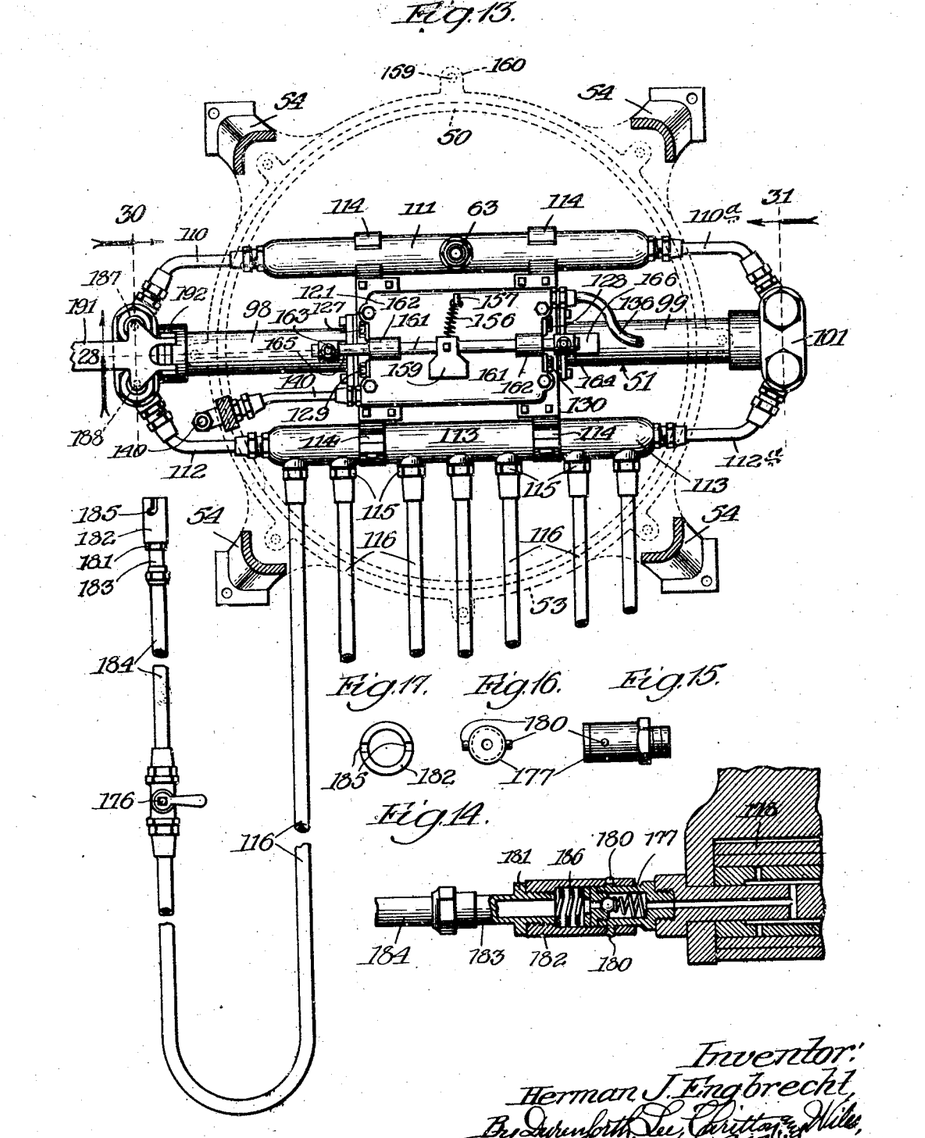
Figure 13 is a plan sectional view taken at the irregular line 13—13 on Fig. 1 and viewed in the direction of the arrows, the grease container being shown by dotted lines, this view showing one of the plurality of hose-lines through which the grease is conducted to the bearing to be lubricated.
Figure 14 is a broken sectional view of a nipple-equipped bearing to be lubricated and a fitting-equipped outlet end of the hose-line, the hose-line being shown as assembled with the nipple in position to discharge grease into the bearing.
Figure 15 is a view in side elevation of the nipple of Fig. 14.
Figure 16 is an end view of the nipple of Fig. 15.
Figure 17 is an end view of the fitting-equipped outlet end of the hose-line.

Assuming that the parts of the piston and cylinder mechanisms are in the positions shown in Figs. 27 and 28, and that the cylinder 99 contains a charge of grease supplied to it through the pipe 109 by the action hereinafter referred to, fluid pressure into the cylinder 87 through the port 89 (the inlet port 90 and the exhaust port 91 being closed and the exhaust port 92 open), will force the piston 88 to the right in Fig. 27 with the result of moving the piston 97 in the same direction and thereby subjecting the grease in the cylinder 99 to relatively great pressure which forces it into the monifold 113 and into the hose-lines 116, the check valve 109 in the head 101 in this movement of the piston closing as soon as the pressure in this cylinder exceeds the pressure of the grease in pipe 110ª. In this movement of the piston 97 in cylinder 99, the piston 96 in cylinder 98 also moves to the right in Figs. 27 and 28, the check valve 108 of the head 100 automatically closing and the check valve 109 of this head automatically opening, the latter as soon as the pressure in pipe 110 exceeds the pressure in the cylinder 98, whereupon this cylinder becomes charged with grease. Upon reversing the direction of movement of the piston 88 and the pistons 96 and 97, by introducing fluid pressure into the cylinder 87 through the port 90, (the inlet 89 and the exhaust port 92 being closed and the exhaust port 91 open) the piston 96 operates to force the grease charged into the cylinder 98 as stated, through the pipe 112 to the manifold 113 and thence to the hose-lines 116, and the cylinder 99 becomes charged with grease from the pipe 110ª as explained of the charging of the cylinder 98 by the movement of these pistons to the right in Fig. 27. The pistons 96 and 97 thus operate alternately to force the grease to the manifold 113 and the hose-lines 116.

The means shown for controlling the supplying of fluid pressure to the cylinder 87 and the exhausting of the same therefrom as hereinbefore referred to, comprise a valve-casing block 121 mounted on the top of the cylinder 87 and containing bores 122, 123, 124 and 125, all of these bores opening into a chamber 126 in this block. The bores 122 and 124 being in alignment with the bores 123 and 125, respectively. Positioned in the ends of the bores 122 to 125, inclusive, are plugs 127 to 130, inclusive, respectively, each of these plugs containing a passage 131, these passages opening, respectively, into the bores referred to. These plugs also contain passages 132 communicating with the passages 131, the passages 132 of the plugs 127 to 130, inclusive, opening into the passages 89, 90, 91 and 92, respectively. The bores 122 and 123 communicate with the passages 133 and 134, which open into a passage 135 communicating with a pipe 136 for conducting into the valve structure the fluid pressure for operating the piston and cylinder mechanism referred to. The bores 124 and 125 which are exhaust-bores open into passages 137 and 138, respectively, communicating with a passage 139 connected with an exhaust pipe 140 which communicates with the port 67 (Fig. 4) in the ring 55 of the grease container.

Figure 19:
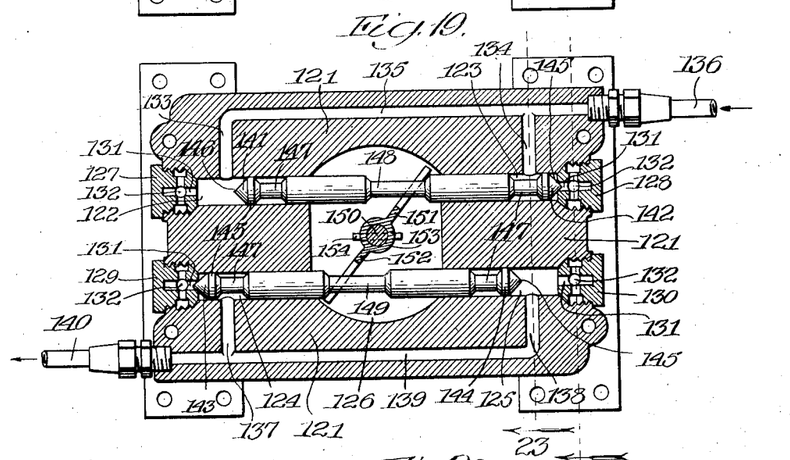
Figure 19 is a section taken at the line 19—19 on Fig. 1 and viewed in the direction of the arrow, this view showing the internal mechanism of the structure illustrated in Fig. 18.
Figure 20:
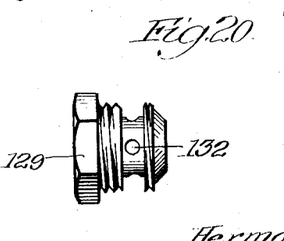
Figure 20 is a view in side elevation of one of the plurality of ported plugs forming parts of the casing of the valve mechanism of Figs. 18 and 19.
Figure 21:
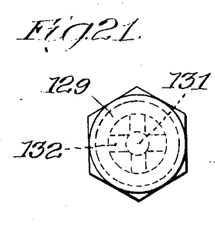
Figure 21 is an end view of the plug of Fig. 20.

The bores 122 to 125, inclusive, contain reciprocable valves 141 to 144, inclusive, respectively, the valves 141 to 142 being connected together for simultaneous movement and the valves 143 and 144 likewise connected together for such movement. Each of the valves just referred to is formed of a head 145 having a tapered extremity 146, the tapered portions 146 being in alignment with the passages 131 of the respective plugs and adapted to seat therein. Each of these valves is provided with a reduced portion 147 in the rear of its head 145 which reduced portion, when the valve is seated against the plug with which it cooperates, is in registration with the particular one of the passages in the block 21 which opens into the bore in which the valve reciprocates. The structures comprising the valves 141 and 142, and 143 and 144, respectively, are cut away intermediate their ends to provide the portions 148 and 149 of reduced diameter, as shown, and these structures are so proportioned, relative to the valve casing, that when the valve of one thereof closes the port in the valve plug with which it cooperates, the valve at the opposite end will extend in a position not to interrupt flow of the fluid between the valve plug cooperating therewith and the passage in the valve casing opening into the bore in which this last-referred-to valve operates, as shown in Fig. 19.

In the arrangement shown the valve mechanism described is operated automatically, in alternation, by the pistons 96 and 97 at the ends of their inward strokes, the particular illustrated construction of means for controlling the operation of the valves, comprising a shaft 150 journalled in the block 121 and extending centrally through the chamber 126. The shaft 150 has rigidly secured thereto yokes 151 and 152 which partially embrace the reduced portions 148 to 149 of the valve structures, and by cooperating with the shoulders at the ends of these reduced portions, reciprocate the plural valve structures in opposite directions, upon oscillating the shaft 150. The yokes 151 and 152 are shown in the form of slotted plates projecting in diametrically opposed directions from a sleeve 153 encircling the shaft 150 and tightly secured thereto as by the pin 154. The shaft 150 at its upper end is provided with a crank arm 155 which engages one end of a coil spring 156 connected at its other end, as indicated at 157, to the block 121. The upper end of the crank arm 155 terminates in a roller 158 which extends upwardly into a yoke 159 having a sleeve portion 160 at which it surrounds, and is rigidly secured to, a rod 161 horizontally slidable in guides 162 rising from the block 121. The rod 161 is provided at its ends with arms 163 and 164 which project at their lower ends through slots 165 and 166 in the walls of the cylinders 98 and 99 and into the path of movement of the pistons 96 and 97, respectively, in the inward movement of the latter, whereby such movement of the pistons operates to shift the rod 161 and, through the crank 155, actuate the shaft 150.

In the particular arrangement shown the supply (not shown) of fluid pressure, as for example compressed air, to be used as the power medium for the apparatus, is connected with a nipple 167 which opens through a port 168, into the interior of a valve casing 169 containing a rotatable valve 170 provided with a crescent port 171. The valve casing 169 also contains a port 172 communicating with pipe 72 (which communicates with the port 71 in the ring 55 of the grease container,) and a port 174 communicating with the pipe 136, the valve 170 being provided to control communication between the several ports 168, 173 and 174. The port 168 communicates with the pipe 65 leading into the bottom of the grease container (Fig. 31) a shut-off valve 175 being provided for controlling the flow of fluid pressure through the pipe 65.

Each hose-line provided for connection with nipples on bearings to be charged with grease, is equipped with a fitting at which it is adapted to connect with the nipple on the bearing, and in advance of this fitting is provided with a shut-off valve 176. Any desirable form, or forms, of fittings may be used. Where the nipples of the bearings to be supplied with grease vary as to form or size as they often do in practice, the fittings of the various hose-lines 116 may be constructed of different forms or sizes to adapt the apparatus to be used in connection with such nipples. In the apparatus shown only one form of fitting is illustrated for cooperation with a particular form of bearing nipple represented at 177 and shown in Fig. 13 as operatively assembled with a spring shackle represented at 178, this nipple being of the type comprising an inwardly opening check valve 179 and provided with radially-extending studs 180. The fitting on the hose-line 116 for cooperation with such nipple, is represented at 181 and comprises a sleeve-like member 182 screwed upon a tubular member 183 secured to the pipe extension 184 of the hose-line, the outer, open end portion of the sleeve 182 containing bayonet slots 185 to receive, and interlock with, the studs 180 upon telescoping the member 182 with the nipple 177, and partially rotating it thereon, a washer 182$^a$, as for example of fiber, being slidable in the sleeve 182 and a coil spring 186 backing this washer, the washer 182$^a$, in connecting the fitting with the nipple, pressing flatwise against the outer face of the nipple under the action of the spring 186 and forming a tight joint between the nipple and sleeve ensuring against egress of the grease through the joint under relatively high pressure, it being understood that when grease under pressure discharges from the hose-line 116 into the nipple 177, the check valve 175 yields inwardly under the force of the incoming grease permitting the latter to pass into the bearing to be lubricated.

Figure 18:
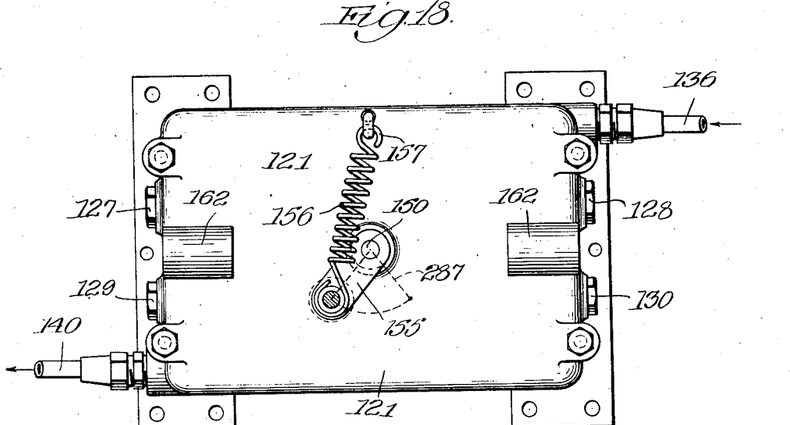
Figure 18 is a plan sectional view, with certain parts omitted, of the valve mechanism controlling the introduction of fluid pressure into the piston and cylinder mechanism for placing the grease under the desired pressure, and controlling the exhaust from this mechanism.
Figure 27:
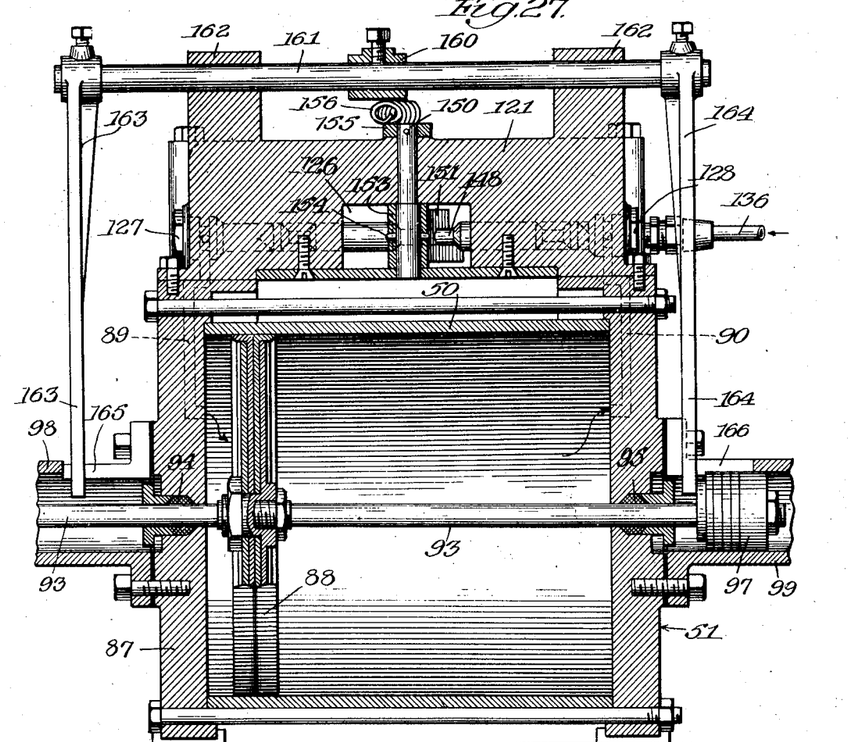
Figure 27 is a broken view in sectional elevation through the piston and cylinder mechanism, the section being taken at the line 27—27 on Fig. 22 and viewed in the direction of the arrows.
Figure 28:
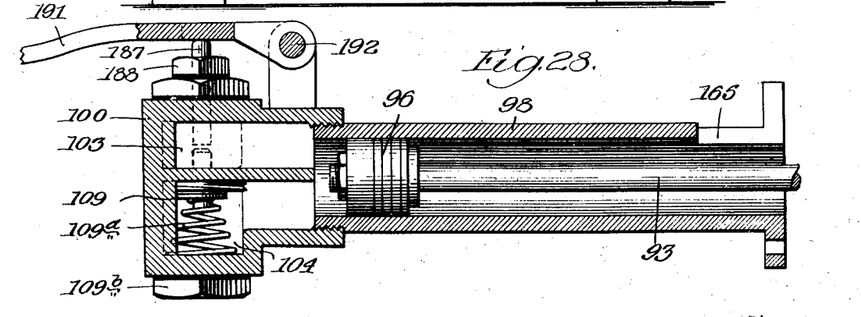
Figure 28 is an enlarged section taken at the line 28 on Fig. 13 and viewed in the direction of the arrow, the structure shown in this figure corresponding with the portion of the piston and cylinder mechanism, illustrated at the left-hand side of Fig. 13.

Assuming that the grease container 50 is charged with grease, and that the parts of the structure are shown in the position represented in Figs. 1, 12, 13, 14, 18, 19, 25, 27 and 28, in which position the valve mechanism of Fig. 19 permits the flow of fluid pressure from the pipe 136 through the passages 135 and 133, bore 122, plug 127, and port 89 into the left-hand end of the cylinder 87 in Fig. 27, and opens the exhaust 92 therefrom to the plug 130, bore 125 and passages 138 and 139 to exhaust pipe 140, the pistons 88, 96 and 97 move to the right in Fig. 27, the piston 96 serving to draw a charge of grease into the cylinder 98 and the piston 97 serving to force the grease in the cylinder 99 to the manifold 113 and hose-lines 116. When the piston 96 nears the limit of its inward movement, it engages the arm 163, thereby shifting the rod 161 to the right in Fig. 27, which latter by reason of the engagement of the yoke 159 thereon with the roller 158 on the crank 155 turns the shaft 150 in counter-clockwise direction in Fig. 18, to a point slightly to the right of dead center in this figure, whereupon the spring 156 forcibly completes the throw of the crank arm to the position represented by the line 287 (Fig. 18). The crank arm 155 in thus moving bodily shifts the structure formed of the valves 141 and 142 to the left in Fig. 19 to close the port 131 in the plug 127 and open the port 131 in the plug 128 to the passage 134, and to close the port 131 in plug 130 and open the port 131 in the plug 129, to the exhaust passage 137. Thus shifting the valves referred to permits the operating fluid pressure to enter the cylinder 87 at the right-hand end thereof in Fig. 27, and the fluid pressure previously introduced into the opposite end of this cylinder, to exhaust therefrom to the pipe 140. The valve structure referred to remains in this position until the piston 97 nears the limit of its inward stroke whereupon the rod 161 is shifted in the opposite direction for actuating, in conjunction with the spring 156, the valve mechanism of Fig. 19, back to the position therein shown, whereupon the operation of the pistons is reversed and they again move to the right in Fig. 27. This automatic shifting of the valve mechanism, controlling the reciprocations of the pistons, continues so long as fluid pressure is supplied to the pipe 136, it being understood, of course, that after pressure of the grease, beyond the piston and cylinder mechanism, has been built up equal to that generated by the operation of the apparatus, the pistons will come to rest, and remain in such position until the pressure beyond it becomes reduced, as for example by discharging grease from the hose-lines to bearings, whereupon the pistons will again start to move to reestablish the pressure in the line beyond it.

In the apparatus shown the fluid pressure exhausting from the opposite ends of the cylinder 87 alternately, through the pipe 140 is utilized to supplement the weight of the piston 80 for forcing the grease into the cylinders 98 and 99 to ensure the full charging thereof upon the inward strokes of the pistons operating therein, this being effected by reason of the connection of the pipe 140 with the port 67 in the ring 55 of the container which leads the exhaust fluid pressure into the container above the piston therein, the relief valve 70 ensuring against the building up in the container of a pressure in excess of that desired.

Figures 9, 10, 11, 12:
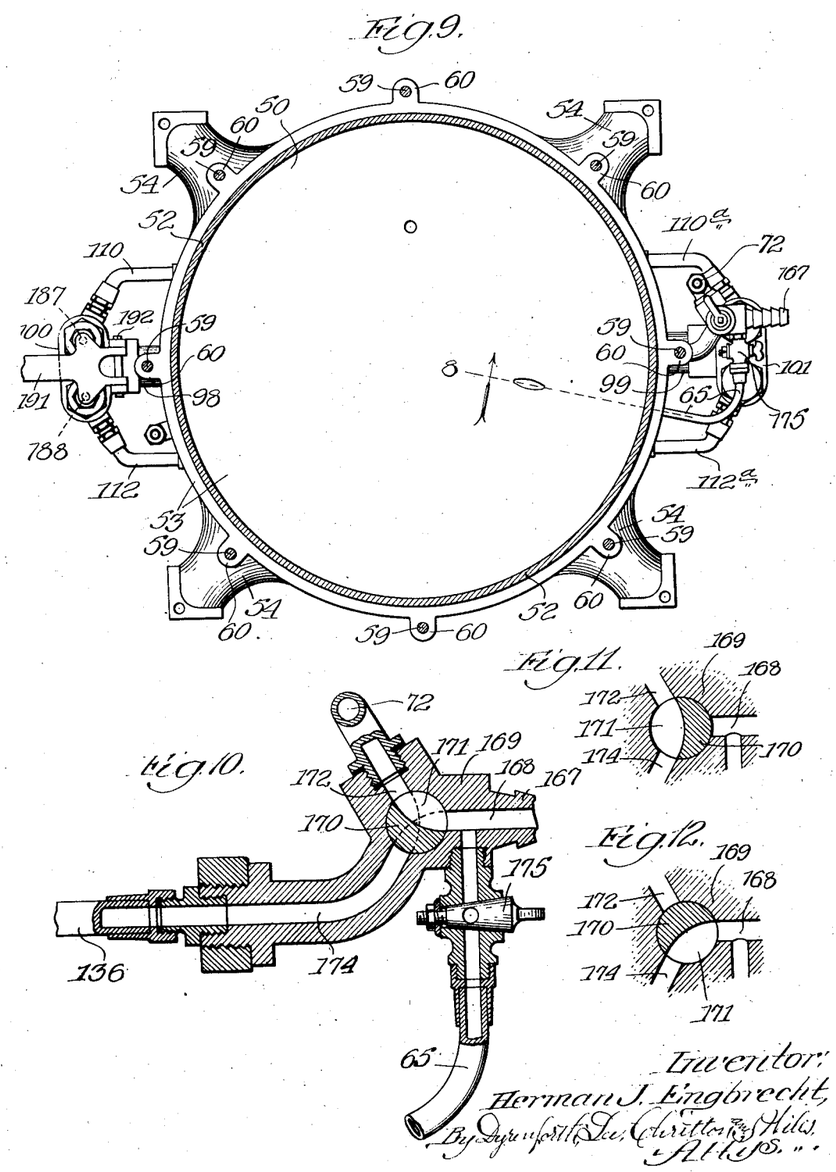
Figure 9 is a plan sectional view of the container taken at the line 9 on Fig. 1 and viewed in the direction of the arrow.
Figure 10 is a plan sectional view of certain of the valved pipe connections associated with the container, the section being taken at the line 10 on Fig. 1 and viewed in the direction of the arrow, the main valve therein shown, being illustrated in the position it occupies for supplying pressure above the piston in the grease-container in the initial functioning of the apparatus.
Figure 11 is a similar view of the valve just referred to showing the position it occupies when the space in the grease-container above the piston, is in communication with the piston and cylinder mechanism for placing the grease under the desired initial pressure.
Figure 12 is a similar view showing the valve in the position it occupies for supplying fluid under pressure from the source of supply thereof, to the piston and cylinder mechanism.

Inasmuch as the exhaust pressure from the cylinder 87, in the initial starting of the apparatus, may not be sufficient to create the desired pressure above the piston 80 in the grease container, provision is made by the valve structure of Figs. 10, 11 and 12, for supplying fluid pressure directly from the source of supply thereof, to the grease container above the piston 80 therein. This is effected by turning the valve 170 to the position shown in Fig. 10 in which position the valve inlet 167 communicates with the pipe 173, and thus with the port 71 in the ring 55, through the medium of the port 171 in the valve. After the desired pressure is built up in the container above the piston the operator turns the valve 170 to the position shown in Fig. 12 in which position the source of fluid pressure is in communication with the pipe 136 of the valve mechanism controlling the grease-displacing piston and cylinder mechanism.

The valve 170 is adapted to effect communication between the pipes 136 and 172 for the purpose of permitting the pressure within the grease-displacing piston and cylinder mechanism and in the valve mechanism controlling the latter, to be relieved, as for example where it is desired that the apparatus be shut down for a considerable period of time; the pressure, in such position of the valve, escaping into the grease container above the piston from which it may vent through the relief valve 70.

The adaptability of the valve 170 for connecting the inlet 167 with the pipe 65, enables pressure, when the valve 175 is in open condition, to enter below the piston 80 to drive it upward in the grease container, when it is desired to lift this piston preliminary to recharging the container with grease. The effect of the fluid pressure entering the container below the piston 80 is first to cleave the bond between the grease and the underside of the piston and thereafter force the piston into the upper portion of the container. By providing the port 68 below the underside of the cylinder top 56, a space is provided therein in which the air above the piston is confined against escape, thus forming an air cushion which cushions the upward stroke of the piston 80, it being understood that the air displaced by the piston in rising escapes through the relief valve 70. The operator, after the piston has reached the position stated, opens the valve 85, to equalize the pressure above and below the piston 80 which thus becomes reduced to relatively low pressure in view of the provision of the relief valve 7. The operator then opens the petcock 69 which vents the space between the piston 80 and the underside of the cylinder top 56, whereupon the pressure in the container below the piston forces the piston to a position in the recess 75, in which it extends wholly therein. The operator then removes the cylinder top 56 by unscrewing it from the ring 55, in assembled relation with the piston. After the container has been again charged with grease, the cylinder top 56 with the piston 80 remaining assembled therewith, is again applied to the ring 55 and screwed into place, the piston 80, remaining during this operation, within the confines of the recess 75. After the cylinder top has been screwed into place the piston is then lowered to engage the grease placed in the container, it being understood that by providing the recess 75 of such size as to completely house the piston 80, and forming its side wall of the same internal diameter as the smallest internal diameter of the ring 55 and of the internal diameter of the side wall 52, the piston 80 may be readily lowered to a position in which it extends into the side wall forming portion 52 of the container, the piston freely sliding downwardly, without obstruction, from the recess 75 into the stationary wall portion of the container.

It will be understood from the foregoing description and drawings that the several valves 141, 142, 143 and 144, (Fig. 19), when engaging with the respective ported plugs which they oppose, are forcibly held seated by reason of the exertion of fluid pressure against them, and that the provision of the cut-out portions 147 effect substantial balancing of the fluid pressure exerted against these valves at the portions thereof between their ends, to minimize wear of these surfaces of the valves which contact with the walls of the bores in which they reciprocate. Thus referring to the valves as positioned in Fig. 19, the subjection of the head 145 of the valve 141 to the fluid pressure entering the bore 122 through the passage 133 forcibly presses the head of the valve 142 against the ported portion of the plug 128 to form a tight joint; and the exhaust fluid pressure discharging from the plug 130 into the bore 125 and against the head 145 of the valve 144, forcibly presses the head 145 of the valve 143 against the ported portion of the plug 129 to produce a tight joint. When these valves are reciprocated, as hereinbefore explained, to open the ports in the plugs 128 and 129 and close the ports in the plugs 127 and 130, the pressure against the ends of the valves 142 and 143 force the valves 141 and 144 against the plugs 127 and 130.

These several valves in their closed position are subjected to fluid pressure laterally directed against them through the passages in the valve casing 121, but by providing the recessed portions 147 this pressure becomes substantially equalized around the reduced portions of the valves thereby minimizing frictional resistance between the valves and the bores in which they reciprocate.

While it is possible, with the apparatus described, to place the grease in the hose-lines 116 under very high pressure, sufficient to force the grease into the bearings to be supplied therewith even when these bearings contain hard accumulations presenting great resistance to the entry of the grease, it may sometimes happen that the accumulations in the bearings are so hard that they effectually resist the passage of grease into the bearings, and under such conditions, it is desirable that the pressure at the fittings on the hose-lines, be relieved to permit the fittings to be removed from the nipples, especially where certain forms of nipples are provided, and prevent squirting of the grease from the fittings. Such relieving of the pressure of the grease is provided for, under the control of the operator, in the present apparatus, by means positioned, when operated, to open the valves 108 and 109 in the head 100 with the result of reducing the pressure of the grease throughout the apparatus to the greatly reduced pressure which exists in the container 50 which is thus caused to communicate directly with the high pressure hose-lines. As a convenient means of opening the valves 108 and 109, the head 100 is provided with rods 187 and 188 slidable in stuffing-boxes 189 and 190 therein and extending at their upper, outer, ends into the path of movement of a hand-operated lever 191 fulcrumed at 192 on the cylinder 98, this lever, when swung downwardly operating, by the depressing of the rods 187 and 188, to force the valves 108 and 109 to open position.

Inasmuch as the pressure in the container is relatively low, the amount of pressure therein being controlled by the relief valve 70, the opening of the valves 108 and 109, as just explained, results in the reducing of the pressure in the hose-lines to such a degree that the fittings thereon may be readily removed from the nipples at the bearings, it being understood that, if desired, the pressure may be reduced to that of the atmosphere by opening the pet-cock 69.

It is preferred that the valve 170 be turned to the position shown in Fig. 11 before operating the valves 108 and 109, as stated, to close the piston and cylinder mechanism 51 to the compressed-air supply and thus avoid rapid reciprocation of this mechanism during the relieving operation.

While I have illustrated and described my invention as embodied in a particular construction of apparatus, I do not wish to be understood as intending to limit it thereto, as the same may be variously modified and altered without departing from the spirit of my invention.

What I claim as new, and desire to secure by Letters Patent, is:

1. In apparatus of the character set forth, the combination of a container for the material, means communicating with said container for placing the material under relatively high pressure, a conduit through which the material discharges from said means, check valves preventing flow of the material from said means to said container and from said conduit to said means, and means for relieving the pressure at the discharge end of said conduit comprising controllable means for rendering said valves open at the same time to thereby reduce the pressure of the material throughout the apparatus to that of the pressure of the material in said container.

2. In apparatus of the character set forth, the combination of a container for the material, piston and cylinder mechanism in communication with said container for placing the material under relatively high pressure, a conduit through which the material discharges from said mechanism, check valves preventing flow of the material from said piston and cylinder mechanism to said container and from said conduit to said piston and cylinder mechanism, and means for relieving the pressure at the discharge end of said conduit comprising controllable means for rendering said valves open at the same time to thereby reduce the pressure of the material throughout the apparatus to that of the pressure of the material in said container.

3. In apparatus of the character set forth, the combination of a container for the material, means communicating with said container for placing the material under relatively high pressure, a conduit through which the material discharges from said means, check valves preventing flow of the material from said means to said container and from said conduit to said means, and controllable means having a single operating element for rendering the said valves open at the same time.

4. In apparatus of the character set forth, the combination of a container for the material, piston and cylinder mechanism in communication with said container for placing the material under relatively high pressure, a conduit through which the material discharges from said means, check valves preventing flow of the material from said piston and cylinder mechanism to said container and from said conduit to said piston and cylinder mechanism, and controllable means having a single operating element for rendering said valves open at the same time.

5. In apparatus of the character set forth, the combination of a container for the material, means communicating with said container for placing the material under relatively high pressure, a conduit through which the material discharges from said means, check valves at opposite sides of said means preventing flow of the material from said means to said container and from said conduit to said means and opening in the same direction, and a movable member adapted to engage said valves and open both thereof in the movement of said member in one direction.

6. In apparatus of the character set forth, the combination of a container for the material, piston and cylinder mechanism for placing the material under relatively high pressure, a conduit through which the material discharges from said mechanism, said cylinder being in communication with said receptacle and said conduit, check valves separate from said piston preventing flow of the material from said cylinder to said container and from said conduit to said cylinder, and controllable means for rendering said valves open at the same time.

HERMAN J. ENGBRECHT.